(12) United States Patent
Yu et al.

(10) Patent No.: US 11,172,655 B2
(45) Date of Patent: Nov. 16, 2021

(54) AQUARIUM

(71) Applicant: GUANGDONG BOYU GROUP CO., LTD, Chaozhou (CN)

(72) Inventors: Youkai Yu, Chaozhou (CN); Bingyan Yu, Chaozhou (CN); Jianqin Yu, Chaozhou (CN)

(73) Assignee: GUANGDONG BOYU GROUP CO., LTD, Chaozhou (CN)

( * ) Notice: Subject to any disclaimer, the term of this patent is extended or adjusted under 35 U.S.C. 154(b) by 317 days.

(21) Appl. No.: 16/268,574

(22) Filed: Feb. 6, 2019

(65) Prior Publication Data

US 2019/0239488 A1 Aug. 8, 2019

(30) Foreign Application Priority Data

Feb. 6, 2018 (CN) .......................... 201820211111.0

(51) Int. Cl.
| | | |
|---|---|---|
| *A01K 63/04* | (2006.01) | |
| *A01K 63/06* | (2006.01) | |
| *A01K 63/00* | (2017.01) | |
| *H01F 27/245* | (2006.01) | |
| *H01F 27/28* | (2006.01) | |
| *H01F 38/14* | (2006.01) | |

(52) U.S. Cl.
CPC .......... *A01K 63/006* (2013.01); *A01K 63/003* (2013.01); *A01K 63/04* (2013.01); *A01K 63/045* (2013.01); *A01K 63/047* (2013.01); *A01K 63/06* (2013.01); *H01F 27/245* (2013.01); *H01F 27/28* (2013.01); *H01F 38/14* (2013.01)

(58) Field of Classification Search
CPC ...... A01K 63/00; A01K 63/04; A01K 63/047; A01K 63/06
USPC ................................ 119/245, 247, 266, 267
See application file for complete search history.

(56) References Cited

U.S. PATENT DOCUMENTS

| | | | | |
|---|---|---|---|---|
| 3,512,646 A | * | 5/1970 | Willinger | F04D 13/026 |
| | | | | 210/167.21 |
| 3,687,291 A | * | 8/1972 | Willinger | A01K 63/047 |
| | | | | 210/167.23 |
| 4,817,561 A | * | 4/1989 | Byrne | A01K 63/042 |
| | | | | 119/260 |
| 5,062,951 A | * | 11/1991 | Tominaga | A01K 63/045 |
| | | | | 210/167.23 |
| 7,527,729 B2 | * | 5/2009 | Wong | A01K 63/045 |
| | | | | 119/259 |
| 8,513,848 B2 | * | 8/2013 | Allis | F04D 13/086 |
| | | | | 310/103 |

* cited by examiner

*Primary Examiner* — David J Parsley
(74) *Attorney, Agent, or Firm* — McNees Wallace & Nurick LLC

(57) ABSTRACT

Disclosed is an aquarium that includes a tank, a magnetic induction transmission apparatus, and a first electric equipment disposed in the tank. The magnetic induction transmission apparatus includes a driving module and a receiving module. The driving module is disposed outside the tank and adjacent to a tank wall of the tank and is configured to be separable from the tank, and the receiving module is disposed on the tank wall of the tank and disposed corresponding to a position of the driving module. The driving module is connected to an external power source. The receiving module is connected to the first electric equipment and is operative to generate an induced current when the driving module is powered on.

12 Claims, 3 Drawing Sheets

AQUARIUM

CROSS-REFERENCE TO RELATED APPLICATIONS

This application claims priority to a Chinese patent application No. 201820211111.0 filed on Feb. 6, 2018, disclosure of which is incorporated herein by reference in its entirety.

TECHNICAL FIELD

The disclosure relates to the technical field of aquariums.

BACKGROUND

The progress of the times provides people with more and more space for leisure activities. Keeping pets has become a way of entertainment as well as releasing stress. One way of keeping pets is to keep a fish or other pets in an aquarium, and thus the aquarium has become an indispensable piece of furniture or decoration in a home or working environment.

The existing aquarium is usually provided with a variety of internal devices such as a water pump, a lamp, a filter, and the like, and the internal devices are typically connected to an external power source through power supply wires directly led in the aquarium. When such power supply mode is adopted for the internal devices, the following defects exist. First, Hidden danger of electric leakage may be brought about by the internal devices unless the internal devices are powered by a low safety voltage. Second, it would be made extremely inconvenient to move, clean and maintain the aquarium when the power supply wires are directly led from outside into inside of the aquarium to connect to the various devices. That is, the internal devices and the power supply connections need to be first removed, then the aquarium may be moved. The operation is quite complicated, thereby bringing people great inconvenience.

In view of the above problems, there is urgent need for designing an aquarium that provides high safety and convenience for power supply connection, so as to facilitate the movement, cleaning and maintenance of the aquarium.

SUMMARY

One object of the present disclosure is to provide an aquarium that can safely power up a first electric equipment within a tank of the aquarium.

Another object of the present disclosure is to provide an aquarium where an electrical connection of the first electric equipment is immediately disconnected as a tank of the aquarium is separated from a base seat.

An aquarium is provided that includes a tank, a magnetic induction transmission apparatus and a first electric equipment disposed in the tank. The magnetic induction transmission apparatus includes a driving module and a receiving module. The driving module is disposed outside the tank at position adjacent to a tank wall of the tank and is configured to be separable from the tank, and the receiving module is disposed on the tank wall of the tank and disposed corresponding to the position of the driving module. The driving module is connected to an external power source. The receiving module is connected to the first electric equipment, and the receiving module is operative to generate an induced current when the driving module is powered on.

In a typical solution of the aquarium, the driving module includes a first magnetic core and a first coil, the first coil is wound around an outer circumference of a first magnetic column of the first magnetic core, the first coil is connected to the external power source, the receiving module includes a second magnetic core and a second coil, the second coil is wound around an outer circumference of a first magnetic column of the second magnetic core, the second coil is connected to the first electric equipment, and a centerline of the first coil coincides with that of the second coil.

In a typical solution of the aquarium, the first magnetic core and the second magnetic core are mirror symmetrical.

In a typical solution of the aquarium, each of the first magnetic core and the second magnetic core includes both the first magnetic column and the second magnetic column, and a non-end position of the second magnetic column is connected to one end of the first magnetic column.

In a typical solution of the aquarium, each of the first magnetic core and the second magnetic core further includes a third magnetic column, a non-end position of the third magnetic column is connected to one end of the first magnetic column facing away from the second magnetic column, and the third magnetic column is parallel to the second magnetic column.

In a typical solution of the aquarium, each of the first magnetic core and the second magnetic core further includes two fourth magnetic columns, two ends of the second magnetic column are connected to the two fourth magnetic columns, respectively, and the first magnetic column and the two fourth magnetic columns are disposed on a same side of the second magnetic column.

In a typical solution of the aquarium, each of the first magnetic core and the second magnetic core further includes a magnetic base plate and two magnetic surrounding plates arranged to space apart from each other and protrude from the magnetic base plate along a circumferential direction of the magnetic base plate, a gap is defined at the magnetic base plate along a radial direction of the magnetic base plate, the gap is located between the two magnetic surrounding plates and penetrates the magnetic base plate in a thickness direction of the magnetic base plate, the first magnetic column is connected to a central position of the magnetic base plate, and the first magnetic column and the two magnetic surrounding plates are disposed on a same side of the magnetic base plate.

In a typical solution of the aquarium, the receiving module is fixed on an outer wall of the tank.

In a typical solution of the aquarium, the aquarium further includes a base seat disposed at a bottom of the tank, where the driving module is fixed on a side of the base seat adjacent to the tank, and the driving module is configured to directly face the receiving module when the tank is mounted onto the base seat.

In a typical solution of the aquarium, the base seat defines a first mounting groove opening toward the tank, the driving module is mounted in the first mounting groove, a base wall of the tank defines a second mounting groove concavely facing toward the tank, and the receiving module is fixedly disposed in the second mounting groove, and an opening of the second mounting groove is configured to directly face the first mounting groove.

This disclosure has the following beneficial effects. The driving module is directly connected to the external power source, disposed adjacent to the tank and separable from the tank. The external power source supplies electrical energy to the driving module, and then the receiving module would be operative to generate an induced current, and through the induced current the first electric equipment disposed in the tank can be powered. Compared with the related art, the first electric equipment can be safely powered in the power supply mode in accordance with various embodiments, and when the electrical connection of the first electric equipment needs to be cut off, only the tank needs to be moved so as to be separated from the external driving module.

Figure 1:
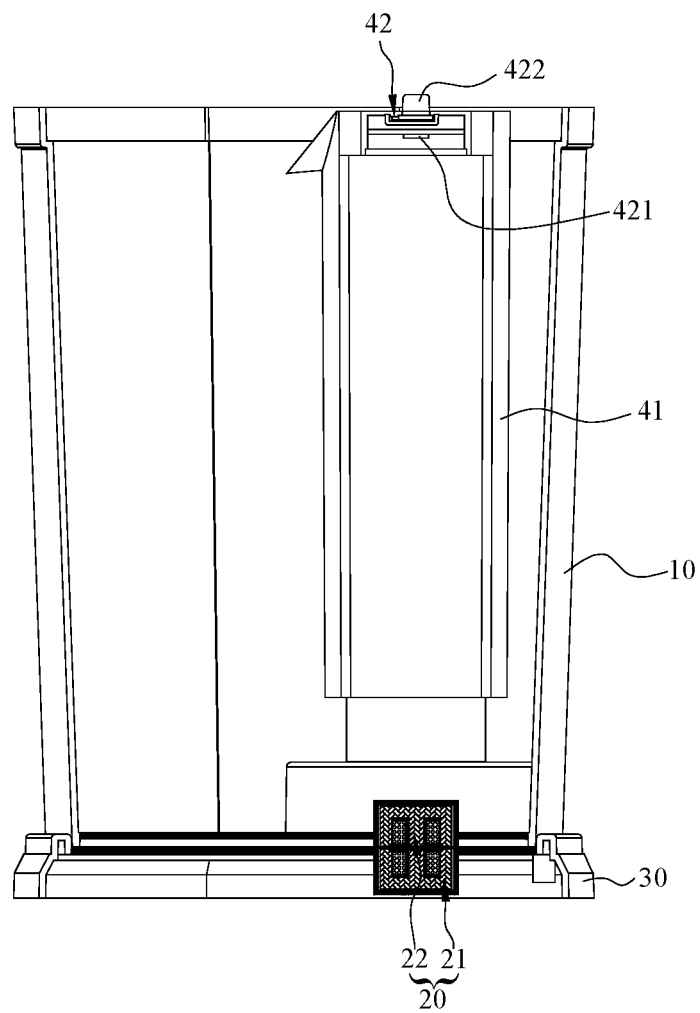
FIG. 1 is a cross-sectional view of an aquarium according to an embodiment of the present disclosure.

| | |
|---|---|
| 10. Tank; | 20. Magnetic Induction Transmission Apparatus; |
| 21. Driving Module; | 211. First Magnetic Core; |
| 212. First Coil; | 22. Receiving Module; |
| 221. Second Magnetic Core; | 222. Second Coil; |
| 201. First Magnetic Column; | 202. Second Magnetic Column; |
| 203. Fourth Magnetic Column; | 204. Magnetic Base Plate; |
| 205. Magnetic Surrounding Plate; | 206. Gap; |
| 30. Base Seat; | 41. Filter; |
| 42. Lighting Fixture; | 421. LED Light; |
| 422. Control Switch. | |

DETAILED DESCRIPTION

Solutions of the present disclosure are further described in detail below by means of specific embodiments in conjunction with the drawings.

Throughout the description of the present disclosure, it should be understood that orientations or positional relationships indicated by terms "inside", "outside" and the like are based on orientations or positional relationships illustrated in the drawings, which are for the mere purpose of conveniently and simply describing the present disclosure and do not indicate or imply that the apparatus or element referred to has a specific orientation and is constructed and operated in a specific orientation, and thus it is not to be construed as limiting the present disclosure.

Furthermore, terms like "first", "second", "third", and "fourth" are merely for description and are not to be construed as indicating or implying relative importance or implicitly indicating the number of indicated technical features. Thus, a feature defined by "first", "second", "third" and "fourth" may explicitly or implicitly include one or more of such features.

Unless otherwise expressly specified and defined, the term "fixed" in the present disclosure is to be construed in a broad sense. For example, it is to be interpreted as permanently connected, detachably connected, or integrated; it is also to be interpreted as mechanically connected or electrically connected; it is also to be interpreted as directly connected or indirectly connected via an intermediary; or it is also to be interpreted as internally connected or interactional between two components. For those of ordinary skill in the art, specific meanings of the above terms in the present disclosure may be understood depending on specific contexts.

In the present disclosure, unless otherwise expressly specified and defined, when a first feature is described as "on" or "below" a second feature, the first feature and the second feature may be in direct contact, or be in contact via another feature disposed between these two features instead of being in direct contact. Moreover, when the first feature is described as "on" the second feature, the first feature may be directly on or obliquely on the second feature, or the first feature may merely be located at a higher level than the second feature. When the first feature is described as "below" the second feature, the first feature may be directly below or obliquely below the second feature, or the first feature may merely be located at a lower level than the second feature.

Figure 2:
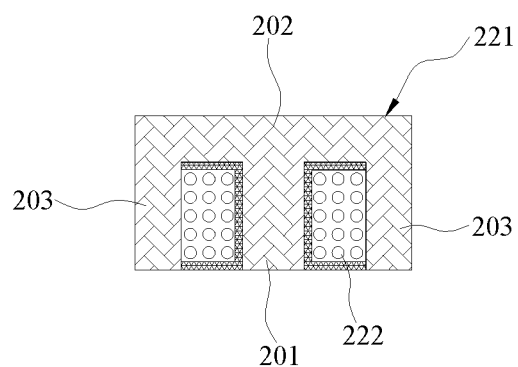
FIG. 2 is a cross-sectional view of a receiving module of an aquarium according to an embodiment of the present disclosure.
Figure 3:
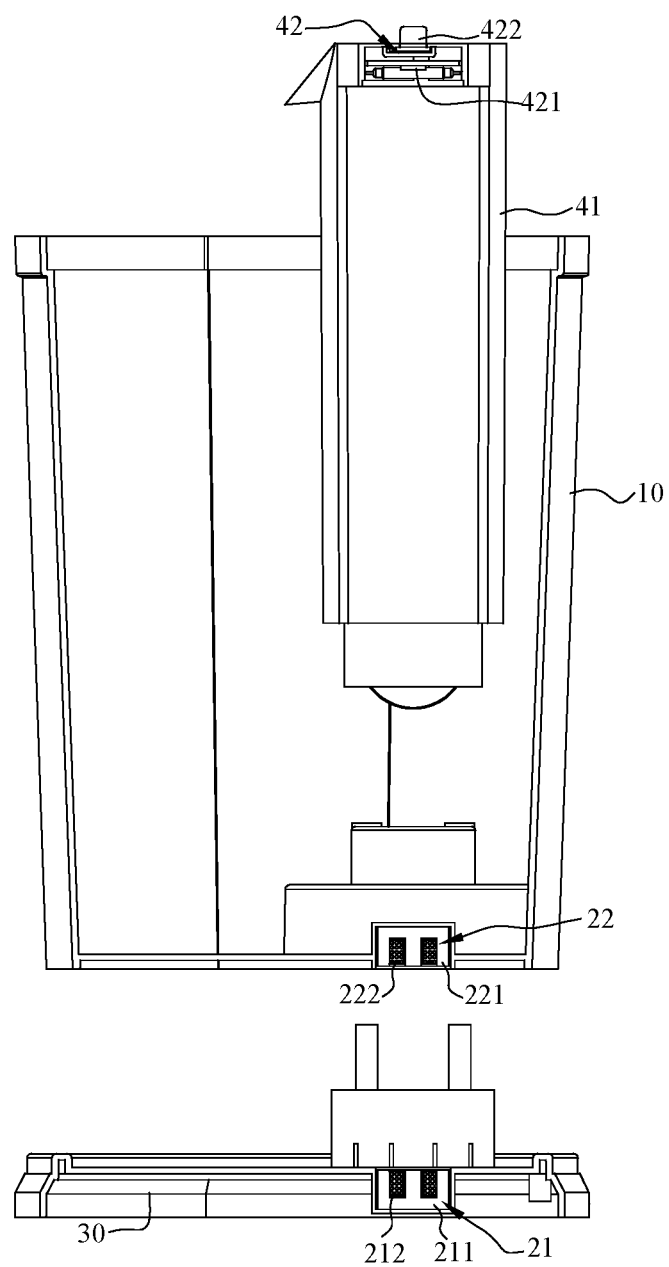
FIG. 3 is a cross-sectional view of an aquarium in a disassemble state according to an embodiment of the present disclosure.

As illustrated in FIGS. 1 to 3, a first embodiment of the present disclosure provides an aquarium. The aquarium includes a tank 10, a magnetic induction transmission apparatus 20 and a first electric equipment disposed in the tank 10. The magnetic induction transmission apparatus 20 includes a driving module 21 and a receiving module 22. The driving module 21 is disposed outside the tank at a position adjacent to a tank wall of the tank 10 and is separable from the tank. The receiving module 22 is disposed on the tank wall of the tank 10 and disposed corresponding to a position of the driving module 21. The driving module 21 is connected to an external power source, the receiving module 22 is connected to the first electric equipment, and the receiving module 22 generates an induced current when the driving module 21 is powered on. Since the driving module 21 is directly connected to the external power source and is disposed adjacent to and separated from the tank 10, the receiving module 22 is enabled to generate the induced current after the external power source inputs electrical energy to the driving module 21. The first electric equipment in the tank 10 may be powered by the induced current. Specifically, the first electric equipment is at low power (power less than 5 w). It is proved by experiments that it is completely feasible to supply power to these low-power first electric equipments in the power supply mode of the embodiment. Compared with the related art, the first electric equipment can be safely powered in the power supply mode of the embodiment, and when the electrical connection of the first electric equipment needs to be disconnected, only the tank 10 needs to be moved so as to be separated from the external driving module 21 outside the tank 10. The tank 10 can be conveniently and rapidly moved.

The receiving module 22 is fixed to the outer wall of the tank 10, and the receiving module 22 may be in close contact with the driving module 21 to improve stability and efficiency of power supply.

The aquarium in the embodiment may further include a base seat 30 disposed at a bottom of the tank 10. The driving module 21 is fixed to a side, adjacent to the tank 10, of the base seat 30. The driving module 21 directly faces the receiving module 22 when the tank 10 is mounted onto the base seat 30. On the contrary, when the tank 10 is separated from the base seat 30, the receiving module 22 faces away from the driving module 22, and the electrical connection of the first electric equipment is disconnected. The configuration positions of the receiving module 22 and the driving module 21 simplify the electrical connection of the first electric equipment.

The base seat 30 may define a first mounting groove that opens toward the tank 10, and the driving module 21 is mounted in the first mounting groove to facilitate the positioning and mounting of the receiving module 22. A base wall of the tank 10 defines a second mounting groove concavely facing toward the tank 10, and the receiving module 22 is fixed in the second mounting groove to facilitate the positioning and mounting of the driving module 21. An opening of the second mounting groove directly faces the first mounting groove. The driving module 21 is arranged in the first mounting groove, and then potted and fixed in the first mounting groove by means of an electrical insulating material such as epoxy resin. The receiving module 22 is arranged in the second mounting groove, and then potted and fixed in the second mounting groove by means of an electrical insulating material such as epoxy resin.

The driving module 21 includes a first magnetic core 211 and a first coil 212, and the first coil 212 is wound around an outer circumference of a first magnetic column 201 of the first magnetic core 211 through a reel and is connected to the external power source. As illustrated in FIG. 2, the receiving module 22 includes a second magnetic core 221 and a second coil 222, and the second coil 222 is wound around an outer circumference of a first magnetic column 201 of the second magnetic core 221 through a reel and is connected to the first electric equipment. A centerline of the first coil 212 coincides with or substantially coincides with a centerline of the second coil 222. Typically, the centerline of the first coil 212 coincides with the centerline of the second coil 222, so that the density of the magnetic flux passing through the second coil 222 can be maximized. After the external power source supplies power to the first coil 212, a certain magnetic field is generated around the first core 211, and the second coil 222 in the receiving module 22 generates an induced current under the action of the magnetic field, thereby supplying power to the first electric equipment.

The electrical energy provided by the external power source may be industrial frequency signals of mains power, and may also be high frequency signals.

The first magnetic core 211 and the second magnetic core 221 may be silicon steel sheets. In other embodiments, they may also be replaced by high frequency transformer magnetic cores.

In the embodiment, the first magnetic core 211 and the second magnetic core 221 are mirror symmetrical. That is, the first magnetic core 211 and the second magnetic core 221 have the same structure and are symmetrically configured with respect to connection faces of the first magnetic core 211 and the second magnetic core 221. This can improve the power supply efficiency.

In a first specific implementation of the embodiment, each of the first magnetic core 211 and the second magnetic core 221 includes the first magnetic column 201 and a second magnetic column 202. A non-end position of the second magnetic column 202 is connected to one end of the first magnetic column 201, and the second magnetic columns 202 are disposed at the bottom of the first mounting groove and the second mounting groove respectively, that is, the first magnetic core 211 and the second magnetic core 221 are both in a T-shaped structure. The structure of the driving module 21 is taken as an example. The first coil 212 is wound around a reel, a through hole is provided at a shaft center of the reel for the first magnetic column 201 to pass through, the first magnetic column 201 is inserted and matched with the reel, and the first coil 212 and the first magnetic core 211 are electrically insulated. The structure of the receiving module 22 is similar to the structure of the driving module 21 and will not be described in detail herein.

In a second specific implementation of the embodiment, a third magnetic column is added on the basis of the above-mentioned first specific implementation. That is, each of the first magnetic core 211 and the second magnetic core 221 further includes the third magnetic column. A non-end position of the third magnetic column is connected to the other end, facing away from the second magnetic column 202, of the first magnetic column 201, and the third magnetic column is parallel to the second magnetic column 202. That is, the first magnetic core 211 and the second magnetic core 221 are both in a I-shaped structure, which facilitates the mounting of the coils.

In a third implementation of the present disclosure, two fourth magnetic columns 203 are added on the basis of the above-mentioned first specific implementation. That is, each of the first magnetic core 211 and the second magnetic core 221 further includes two fourth magnetic columns 203, the two ends of the second magnetic column 202 are connected to the two fourth magnetic columns 203 respectively, and the first magnetic column 201 and the two fourth magnetic columns 203 are disposed on the same side of the second magnetic column 202. The first magnetic core 211 and the second magnetic core 221 of the embodiment are both in an E-shaped structure, which facilitates the coil mounting and the potting processing.

Figure 4:
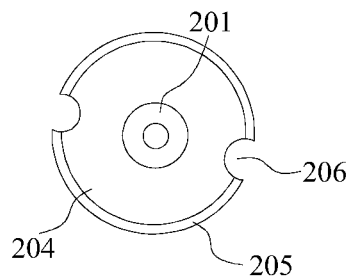
FIG. 4 is a top view of a first magnetic core of a driving module of an aquarium according to an embodiment of the present disclosure.
Figure 5:
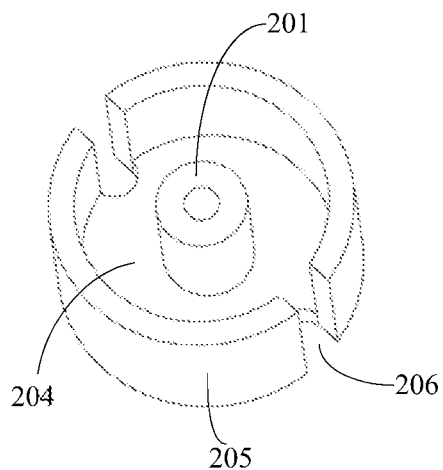
FIG. 5 is a perspective view of a first magnetic core of a driving module of an aquarium in accordance with the embodiment illustrated in FIG. 4.

In other specific implementation solutions of the present disclosure, the first magnetic core 211 and the second magnetic core 221 may also be designed as a can-type structure. As illustrated in FIG. 4 as well as in FIG. 5 which is a perspective view of the above-mentioned can-type structure, each of the first magnetic core 211 and the second magnetic core 221 further includes a magnetic base plate 204 and two magnetic surrounding plates 205 arranged to space apart from each other and protrude from the magnetic base plate 204 along a circumference of the magnetic base plate 204. The magnetic base plate 204 defines a gap 206 along a radial direction of the magnetic base plate 204 so that the outgoing of the wires is facilitated. The gap 206 is located between the two magnetic surrounding plates 205 and penetrates the magnetic base plate 204 in a thickness direction of the magnetic base plate 204. The first magnetic column 201 is connected to a central position of the magnetic base plate 204, and the first magnetic column 201 and the magnetic surrounding plates 205 are disposed on the same side of the magnetic base plate 204.

Typically, a through hole may further be provided in the first magnetic column 201 in a length direction of the first magnetic column 201 for convenient fixing.

In this embodiment, the first electric equipment includes a lighting fixture 42. A filter 41 is detachably mounted at the inner bottom of the tank 10. The lighting fixture 42 is mounted on the filter 41. The lighting fixture 42 includes a light emitting diode (LED) light 421 and a control switch 422 for controlling the switching of the LED light 421. The lighting fixture 42 is connected to the second coil 222 of the receiving module 22. The lighting fixture 42 may be electrically connected to the second coil 222 directly or through a driving circuit. The driving circuit may provide a low-voltage direct current power source and a voltage change for the first electric equipment such as the lighting fixture 42, and control the ON and OFF of the first electric equipment.

In this embodiment, the aquarium may further include a cover detachably mounted on the upper end of the tank 10.

A second embodiment of the present disclosure differs from the above first embodiment in that: the aquarium further includes a second electric equipment. The second electric equipment is a water pump which includes a pump housing mounted in the tank 10, a permanent magnet rotor, a vane wheel and a stator mounted on the base seat 30. The permanent magnet rotor is connected to the vane wheel in the pump housing through a rotating shaft. A stator containing chamber is concavely defined in the base wall of the tank 10 in a direction facing toward the tank 10. When the tank 10 is mounted on the base seat 30, the stator is located in the stator containing chamber, and the permanent magnet rotor is located between two iron core protrusions of the U-shaped iron core of the stator. The permanent magnet rotor and the stator of the water pump are respectively disposed on an inner side and an outer side of the tank 10, which improves the electrical safety of the water pump.

Further, the pump housing, the permanent magnet rotor and the vane wheel of the water pump are detachably fixed to the lower end of the filter 41, and the filter 41 is detachably fixed in the tank 10. The pump housing, the permanent magnet rotor and the vane wheel of the water pump may be altogether removed from the tank 10 by removing the filter 41, which facilitates cleaning and maintenance of the aquarium.

It should be illustrated that the above-mentioned specific implementations are merely illustrative embodiments of the present disclosure and the technical principles used therein. Without departing from the technical scope disclosed by the present disclosure, any changes or substitutions that are easily conceivable to those skilled in the art should all fall in the protection scope of the present disclosure.

The present disclosure has been illustrated by way of the above embodiments but is not limited to these embodiments. It should be understood by those skilled in the art that various modifications, equivalent substitutions, changes or the like may be made for the present disclosure, however, without departing from the spirit of the present disclosure, these all fall in the scope of the present disclosure. In addition, some terms used in the specification and appended claims of the present application are intended for the mere purpose of facilitating description instead of limiting.

What is claimed is:

1. An aquarium, comprising a tank, a magnetic induction transmission apparatus, and a first electric equipment disposed in the tank, wherein the magnetic induction transmission apparatus comprises a driving module and a receiving module, wherein the driving module is disposed outside the tank at a position adjacent to a tank wall of the tank and is configured to be separable from the tank, the receiving module is disposed on the tank wall of the tank and disposed corresponding to the position of the driving module, the driving module is connected to an external power source, the receiving module is connected to the first electric equipment, and the receiving module is operative to generate an induced current when the driving module is powered on, wherein the driving module comprises a first magnetic core and a first coil, the first coil is wound around an outer circumference of a first magnetic column of the first magnetic core, and the first coil is connected to the external power source; the receiving module comprises a second magnetic core and a second coil, the second coil is wound around an outer circumference of a first magnetic column of the second magnetic core, and the second coil is connected to the first electric equipment; and a centerline of the first coil coincides with that of the second coil, wherein the first magnetic core and the second magnetic core are mirror symmetrical, wherein each of the first magnetic core and the second magnetic core comprises the first magnetic column and the second magnetic column, and a non-end position of the second magnetic column is connected to one end of the first magnetic column, and wherein each of the first magnetic core and the second magnetic core further comprises a third magnetic column, a non-end position of the third magnetic column is connected to one end of the first magnetic column facing away from the second magnetic column, and the third magnetic column is parallel to the second magnetic column.

2. The aquarium of claim 1, wherein the receiving module is fixed on an outer wall of the tank.

3. The aquarium of claim 2, further comprising a base seat disposed at a bottom of the tank, wherein the driving module is fixed on a side of the base seat adjacent to the tank, and the driving module is configured to directly face the receiving module when the tank is mounted onto the base seat.

4. The aquarium of claim 3, wherein the base seat defines a first mounting groove opening toward the tank, the driving module is mounted in the first mounting groove, a bottom wall of the tank defines a second mounting groove concavely facing toward the tank, and the receiving module is fixedly disposed in the second mounting groove, and an opening of the second mounting groove is configured to directly face the first mounting groove.

5. An aquarium, comprising a tank, a magnetic induction transmission apparatus, and a first electric equipment disposed in the tank, wherein the magnetic induction transmission apparatus comprises a driving module and a receiving module, wherein the driving module is disposed outside the tank at a position adjacent to a tank wall of the tank and is configured to be separable from the tank, the receiving module is disposed on the tank wall of the tank and disposed corresponding to the position of the driving module, the driving module is connected to an external power source, the receiving module is connected to the first electric equipment, and the receiving module is operative to generate an induced current when the driving module is powered on, wherein the driving module comprises a first magnetic core and a first coil, the first coil is wound around an outer circumference of a first magnetic column of the first magnetic core, and the first coil is connected to the external power source; the receiving module comprises a second magnetic core and a second coil, the second coil is wound around an outer circumference of a first magnetic column of the second magnetic core, and the second coil is connected to the first electric equipment; and a centerline of the first coil coincides with that of the second coil, wherein the first magnetic core and the second magnetic core are mirror symmetrical, wherein each of the first magnetic core and the second magnetic core comprises the first magnetic column and the second magnetic column, and a non-end position of the second magnetic column is connected to one end of the first magnetic column, and wherein each of the first magnetic core and the second magnetic core further comprises two third magnetic columns, two ends of the second magnetic column are connected to the two third magnetic columns respectively, and the first magnetic column and the two third magnetic columns are disposed on a same side of the second magnetic column.

6. The aquarium of claim 5, wherein the receiving module is fixed on an outer wall of the tank.

7. The aquarium of claim 6, further comprising a base seat disposed at a bottom of the tank, wherein the driving module is fixed on a side of the base seat adjacent to the tank, and the driving module is configured to directly face the receiving module when the tank is mounted onto the base seat.

8. The aquarium of claim 7, wherein the base seat defines a first mounting groove opening toward the tank, the driving module is mounted in the first mounting groove, a bottom wall of the tank defines a second mounting groove concavely facing toward the tank, and the receiving module is fixedly disposed in the second mounting groove, and an opening of the second mounting groove is configured to directly face the first mounting groove.

9. An aquarium, comprising a tank, a magnetic induction transmission apparatus, and a first electric equipment disposed in the tank,
wherein the magnetic induction transmission apparatus comprises a driving module and a receiving module,
wherein the driving module is disposed outside the tank at a position adjacent to a tank wall of the tank and is configured to be separable from the tank, the receiving module is disposed on the tank wall of the tank and disposed corresponding to the position of the driving module, the driving module is connected to an external power source, the receiving module is connected to the first electric equipment, and the receiving module is operative to generate an induced current when the driving module is powered on,
wherein the driving module comprises a first magnetic core and a first coil, the first coil is wound around an outer circumference of a first magnetic column of the first magnetic core, and the first coil is connected to the external power source; the receiving module comprises a second magnetic core and a second coil, the second coil is wound around an outer circumference of a first magnetic column of the second magnetic core, and the second coil is connected to the first electric equipment; and a centerline of the first coil coincides with that of the second coil,
wherein each of the first magnetic core and the second magnetic core further comprises a magnetic base plate and two magnetic surrounding plates arranged to space apart from each other and protrude from the magnetic base plate along a circumference of the magnetic base plate, a gap is defined at the magnetic base plate gap along a radial direction of the magnetic base plate, the gap is located between the two magnetic surrounding plates and penetrates the magnetic base plate in a thickness direction of the magnetic base plate; and
wherein the first magnetic column is connected to a central position of the magnetic base plate, and the first magnetic column and the two magnetic surrounding plates are disposed on a same side of the magnetic base plate.

10. The aquarium of claim 9, wherein the receiving module is fixed on an outer wall of the tank.

11. The aquarium of claim 10, further comprising a base seat disposed at a bottom of the tank, wherein the driving module is fixed on a side of the base seat adjacent to the tank, and the driving module is configured to directly face the receiving module when the tank is mounted onto the base seat.

12. The aquarium of claim 11, wherein the base seat defines a first mounting groove opening toward the tank, the driving module is mounted in the first mounting groove, a bottom wall of the tank defines a second mounting groove concavely facing toward the tank, and the receiving module is fixedly disposed in the second mounting groove, and an opening of the second mounting groove is configured to directly face the first mounting groove.

\* \* \* \* \*